United States Patent [19]

Solimans et al.

[11] 3,812,460

[45] May 21, 1974

[54] READ-HEAD FOR AN OPTICAL CHARACTER-RECOGNITION SYSTEM

[75] Inventors: Georges Solimans; Leon Felix Personnaz, both of Paris, France

[73] Assignee: Societe Industrielle Honeywell Bull (Societe anonyme), Paris, France

[22] Filed: Sept. 15, 1972

[21] Appl. No.: 289,392

[30] Foreign Application Priority Data

Sept. 17, 1971 France ............................ 71.33569

[52] U.S. Cl. ................ 340/146.3 MA, 340/146.3 H, 340/146.3 AH

[51] Int. Cl. ............................................ G06k 9/12

[58] Field of Search ............ 340/146.3 MA, 146.3 J, 340/146.3 E, 146.3 H, 146.3 R, 146.3 AH; 250/220 M, 208 X

[56] References Cited

UNITED STATES PATENTS

| | | | |
|---|---|---|---|
| 3,104,369 | 9/1963 | Rabinow et al. | 340/146.3 MA |
| 3,493,812 | 2/1970 | Weimer | 250/220 M |
| 3,710,319 | 1/1973 | Miller et al. | 340/146.3 J |
| 3,699,519 | 10/1972 | Campbell | 340/146.3 E |
| 3,551,887 | 12/1970 | Vaccaro et al. | 340/146.3 H |

*Primary Examiner*—Paul J. Henon
*Assistant Examiner*—Leo H. Boudreau
*Attorney, Agent, or Firm*—Fred Jacob

[57] ABSTRACT

A read head for an optical character-recognition system including a plurality of photodetectors coupled to at least two shift registers, clock signals for activating the shift registers, and a logic circuit for interconnecting the shift registers. By varying the arrangement of the logic circuit elements, the read head can be adapted for a plurality of scanning modes used in conjunction with optical character-recognition systems. The logic circuit suppresses false data groups introduced by spurious photodetector signals.

17 Claims, 6 Drawing Figures

READ-HEAD FOR AN OPTICAL CHARACTER-RECOGNITION SYSTEM

BACKGROUND OF THE INVENTION

The object of the present invention is a read head, designed particularly, but not exclusively, for an optical character-recognition system, including a strip of photodetectors associated with a switching device synchronized by clock signals, each of the photodetectors being connected with a switching stage, where a character support passes in a direction roughly perpendicular to the axis of the strip.

The problem of optical recognition of alphanumerical characters, positioned on a line, consists in converting of the distributions of features, corresponding with the vertical parts of a character, into a series of pulses which will be compared with other series, symbolizing characters to be recognized, contained in a memory. It is, therefore, required that the character support be scanned by a detector so as to accomplish the necessary spatio-temporal conversion. One method of effecting this scanning consists in having the character support (scanning X) passing in front of a strip of electro-optic detectors such as photodiodes, while it (the strip) in turn is scanned along its length (scanning along Y). The speed of the movement of the support has to be sufficiently slow compared to the speed of the scanning of the strip so that it is possible to assume in a first approximation that the support remains immobile during the period of a scanning of the strip. The support is illuminated by a source which emits light of a wave length suitable for the response curve of the photodiodes. The reflection coefficient of the support varies as a function of the presence or absence of the component features of a character. The light intensity received by each of the photodiodes consequently depends on the reflection coefficient. The diodes furnish a current which is proportional to the light reflected by the support.

Read heads are available which comprise a strip of photodiodes associated with a shift register, each of the photodiodes being coupled to a stage of the register. Each photodiode is thus sequentially connected with the output circuit in the natural order of the numbers 1, 2, 3, . . . , *m*, 1, 2, 3, . . ., *m* through the intermediary of the register which has the function of a switch. This method of scanning can turn out to be inadequate in the case where the character is poorly printed.

One object of the present invention is the design of a read head which makes different methods of scanning possible appropriate to the demands that are to be encountered in practice.

Another difficulty occurring in the optical character-recognition is the elimination of false modes. "Mode" is defined as a sequence of states of one or several shift registers. The modes define the individual scanning sequences of the strip. The noise introduced into a shift register by any exterior source is revealed by the appearance of confusing pulses, which modify in an erroneous fashion the status of certain register stages and produce what is termed "false modes." As known in practice, this becomes apparent by an increased rate of rejection, i.e., the recognition system is unable to recognize a statistically acceptable number of characters. It is imperative to suppress these false modes in the course of a scanning cycle, or else the result would be a series of erroneous data incompatible with the recognition of the character passing in front of the head. For example, when the state of the different register stages is represented by "0" and "1," the evolution of these states in time may be described in the following manner for the case of the appearance of a noise "1,"

| | | |
|---|---|---|
| 1 : 0100010 | 4 : 0000100 | 7 : 1000000 |
| 2 : 0010001 | 5 : 0000010 | |
| 3 : 0001000 | 6 : 0000001 | |

It is then necessary, in this example, that at a given moment, only one register stage be in position 1 to switch the suitable photodetector to the output circuit.

SUMMARY OF THE INVENTION

The present invention is based on the idea that it is possible to eliminate a false mode during a cycle by using a suitable closed-loop circuit. According to the invention, the read head for an optical character-recognition system, the characters being positioned in a line passing in front of said head, including a strip of n photodiodes roughly perpendicular to the passing direction, and a switch synchronized by clock signals, connecting sequentially each of the photodiodes to the output of the head, is characterized in that the n photodiodes are divided into $n'$ subsystems connected with $n'$ distinct shift registers enabling interconnected switching by a logical closed-loop circuit.

According to another characteristic of the invention, the $k$-$l$ first stages of a register containing $k$ stages are connected with $k$-$l$ inputs of an OR gate whose output is used for purposes of closed-loop circuiting.

If the *k-th* of a register has to furnish a trigger signal for the following register, this triggering will only occur when all the preceding $k$-$l$ stages are in the zero state which is denoted by the value of th output signal of the OR gate. Without leaving the framework of the invention, one can of course replace the OR gate with circuits of the NOR type, for example.

In the examples described in the following, the number n of the photodiodes is 65 and the number $n'$ of the subsystem is 2. The use of two registers makes possible, on the one hand, a simultaneous utilization of two punctual regions of the character, and on the other hand, the elimination of the false modes in a single scanning cycle.

Further characteristics and advantages of the invention will evolve in the course of the following description of various types of embodiment with reference to the illustrations.

DESCRIPTION OF THE PREFERRED EMBODIMENT

Figure 1:
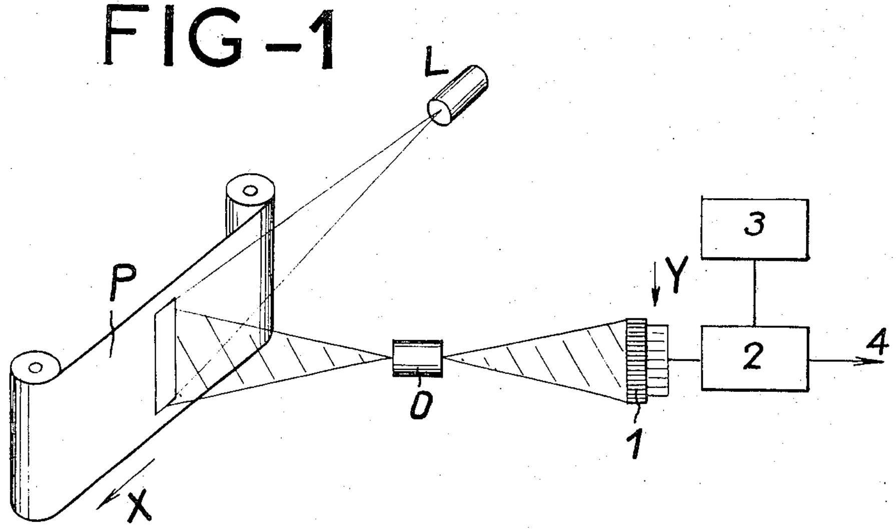
FIG. 1 is a schematic diagram of the reading according to the invention.

FIG. 1 represents the schematic diagram of the reading according to the invention. The paper P passes in a vertical plane along the horizontal X direction in front of the strip of photodiodes 1 which is parallel to the plane of the paper and is scanned in the Y direction. A light source L illuminates a part of the paper which constitutes the reading field, this field being projected onto the strip of photodiodes 1 by means of the objective O. The read head 1 is coupled with an output 4 linked to a coding stage, not shown, by means of a switch 2 controlled by a clock-signal generator 3. According to one of the characteristics of the invention, the switch 2 includes two shift registers which, by a procedure described thereafter, successively couples one or several diodes with the output line.

Figure 2:
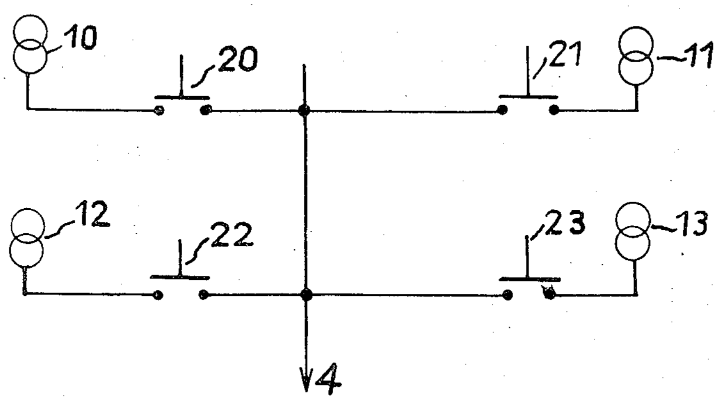
FIG. 2 is a diagram of the operation of the switching of the photodiodes to the coding stage positioned at the output of the head

FIG. 2 provides a better comprehension of how the shift registers operate.

Four photodiodes 10, 11, 12, 13 are connected with output 4 over four gates, illustrated in diagram form by 20, 21, 22, 23 which, in practice, consist of the MOS gates, integrated, for example, in the read head. The photodiodes 10, 11, 12, 13 are shown by the symbol used for the current generators for they will transmit in the output currents whose strength is a function of the light intensity which they receive. The diodes 10 and 12 on the left of the illustration symbolize the system of even-row diodes and the diodes 11 and 13 on the right symbolize the system of odd-row diodes. It goes without saying that in the practice, these diodes are aligned.

Several scanning methods may be utilized, notably a method, termed "sequential", by which all diodes of the odd-row, then all diodes of the even-row are scanned sequentially which corresponds in FIG. 2 to the sequence 11, 13, . . . , 10, 12, a mode called "simultaneous" by which an odd-row diode and an even-row diode are placed into contact simultaneously with the output, and an alternating mode.

Figure 3:
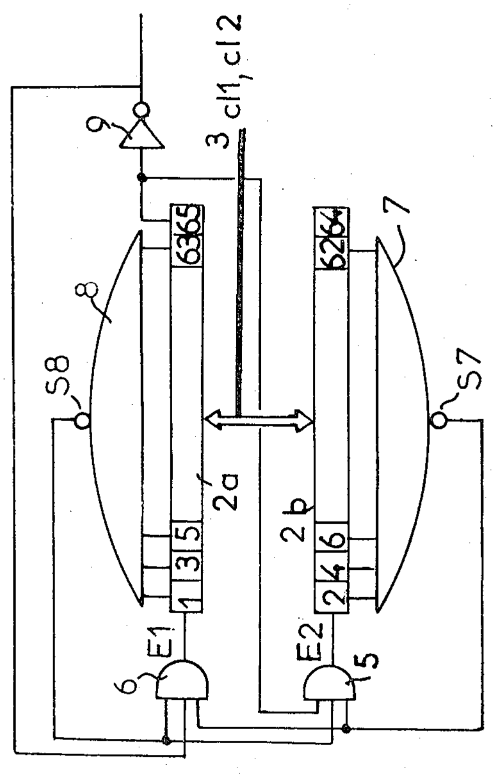
FIG. 3 is a logical connecting diagram for a first scanning mode.
Figure 4:
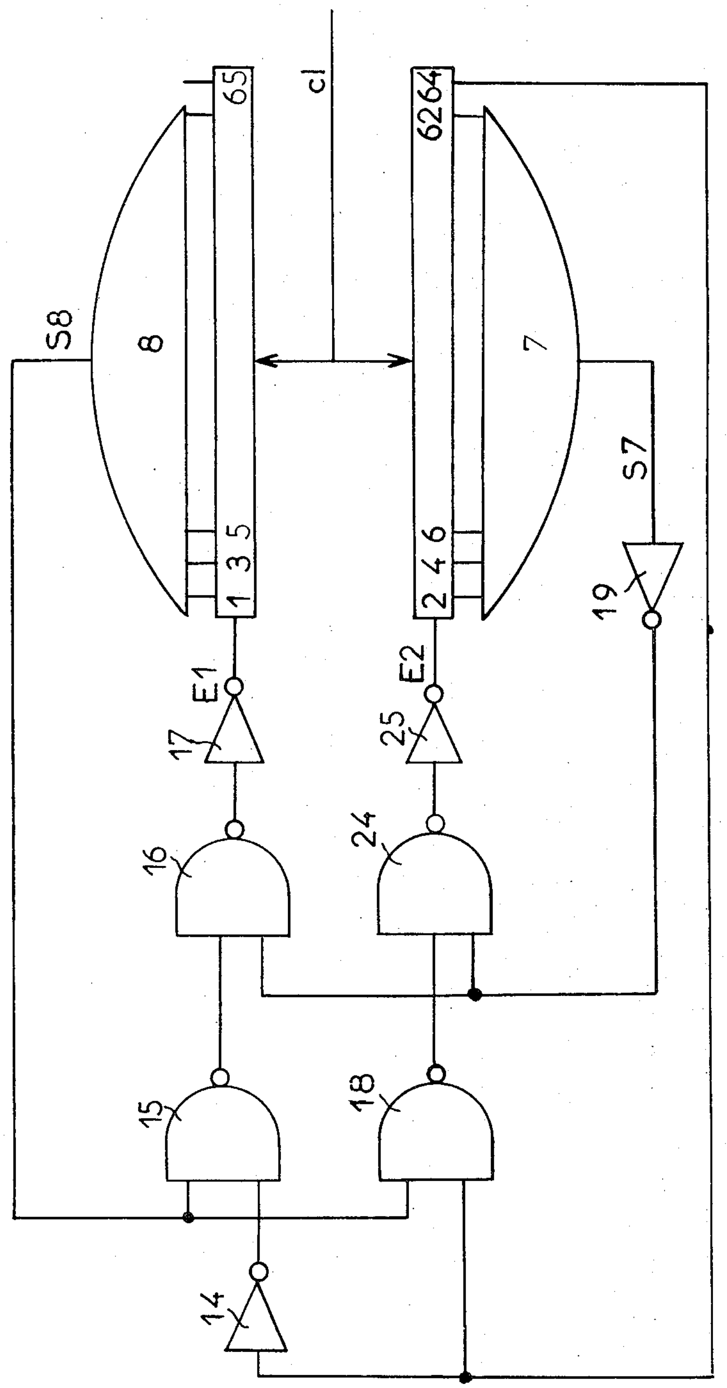
FIG. 4 is a logical connecting diagram for a second mode of scanning.
Figure 5:
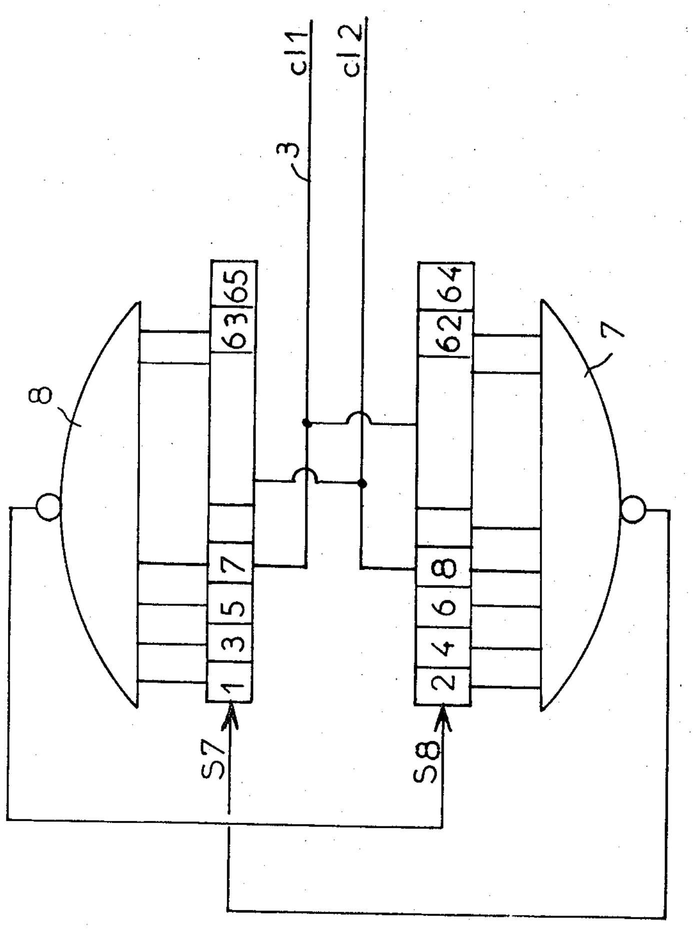
FIG. 5 is a logical diagram for a third mode of scanning.

In FIGS. 3, 4, and 5, only the elements are illustrated which constitute the scanning circuits of the strip for the three modes of operation listed above. In a preferred version of the embodiment of the invention, the photodiodes, their connections with the two shift registers, as such the registers *2a* and *2b* and the two OR gates (7 and 8) are integrated into a microcircuit. One obtains in this manner a component with a limited number of input and output terminals which, by connection of suitable outside components, permits the choice of different scanning modes for the strip. The photodiode strip is not shown in these three figures, but it is self evident that according to a special version of embodiment of the invention, the diodes of the even-row are connected with one of the registers and that the diodes of the odd-row are linked to the other register, one photodiode being tied to one stage of one of the registers.

FIG. 3 exhibits the circuits used in the case of scanning called "sequential" according to which the set of photodiodes of the odd-row is scanned first and then the set of photodiodes of the even-row.

The two shift registers 2a and 2b receive, simultaneously, a command signal applied to the inputs E1 and E2 respectively and a clock signal which causes the register to advance. For technical reasons independent of the invention, the clock signal consists of two out-of-phase signals CL1 and CL2.

The stages 1 to 63 in the register 2a are linked to the corresponding inputs of an OR or NOR (NOT-OR) gate 8, which supplies a signal S8, applied, on the one hand, to one of the inputs of the AND gate 6, and on the other hand, to one of the inputs of the AND gate 5. The signal emitted by the stage 65 is applied, on the one hand, to one of the inputs of gate 5 and, after the inversion in the inverter 9, to one of the inputs of the gate 6. The signal emitted by the OR gate 7 is coupled to the stages 2 to 62 of the register 2b and is applied after inversion to the gates 5 and 6, which furnish the command signals to the inputs E1 and E2 of the registers *2a* and *2b*. A logical "1" applied either to E1 or to E2 causes the input of a "1" in the register accompanying the following clock signal (in other words, as if the stage $k$ would be stage "1", the stage $k+l$ would place itself in turn in the state "1", the stage $k$ returning to zero at the following clock signal).

All the stages of the register *2a* and all the stages of the register 2b take on successively in this way the status "1".

The logical equations of the inputs of the circuit thus realized are written:

$$E1 = \overline{S8} \cdot \overline{S7} \cdot \overline{65} \text{ and}$$

$$E2 = \overline{S8} \cdot \overline{S7} \cdot 65$$

These equations result from the matrx of stages which will be explained by the example, illustrated in FIG. 4. S7, S8, and 65 denote the different states of the gates 7 and 8 and of the stage 65 of the register 2a during the scanning.

FIG. 4 illustrates the couplings utilized to obtain the so-called "simultaneous" scanning mode. The gates 7 and 8 are OR gates which furnish signals S7 and S8, respectively. In the mode termed "simultaneous," two adjoining photodiodes and inverse parities are simultaneously coupled with the output. For example, one takes 1 and 2, 3 and 4, . . . , 64 and 65, 1 and 2 . . . The output of the gate 8 is coupled with an input of the NAND (NOT AND) gates 15 and 18, respectively, the second input of the gate 18 being coupled with the stage 64 of the register 2b and the second input of the gate 15 with the same stage, but through the inverter 14. The output of the OR gate 7 is coupled through the inverter 19 to an input of the NAND gates 16 and 24 which receive on their second inputs, the output signals of the gates 15 and 18, respectively. The outputs of gates 16 and 24 are c oupled with the inputs of registers *2a* and *2b* by the intermediary of inverters 17 and 25. It goes without saying that other coupling circuits could have been utilized and that the one used in FIG. 4 represents only one possibility.

Under these conditions, the phase matrix is written under the assumption that the scanning is performed correctly:

STATE MATRIX FOR THE SIMULTANEOUS MODE

| List | 1 | 3 | 5 | 7 | 9 | . . . | 63 | 65 | $\overline{S8}$ | E1 | 2 | 4 | 6 | 8 | . . . | 62 | 64 | S7 | E2 |
|---|---|---|---|---|---|---|---|---|---|---|---|---|---|---|---|---|---|---|---|
| 0 | 0 | 0 | 0 | 0 | 0 | . . . | 0 | 0 | 1 | 1 | 0 | 0 | 0 | 0 | . . . | 0 | 0 | 1 | 1 |
| 1 | 1 | 0 | 0 | 0 | 0 | . . . | 0 | 0 | 0 | 0 | 1 | 0 | 0 | 0 | . . . | 0 | 0 | 0 | 0 |
| 2 | 0 | 1 | 0 | 0 | 0 | . . . | 0 | 0 | 0 | 0 | 0 | 1 | 0 | 0 | . . . | . | 0 | . | . |
| 3 | 0 | 0 | 1 | 0 | 0 | . . . | 0 | 0 | 0 | . | 0 | 0 | 1 | 0 | . . . | . | 0 | . | . |
| 4 | 0 | 0 | 0 | 1 | 0 | . . . | 0 | 0 | 0 | . | 0 | 0 | 0 | 1 | . . . | . | 0 | . | . |
| . | . | . | | | | | | | | | | | | | | | | | . |
| . | . | . | | | | | | | | | | | | | | | | | |
| . | . | . | | | | | | | | | | | | | | | | | |

STATE MATRIX FOR THE SIMULTANEOUS MODE – Continued

| List | 1 | 3 | 5 | 7 | 9 | ... | 63 | 65 | $\overline{S8}$ | E1 | 2 | 4 | 6 | 8 | ... | | 62 | 64 | S7 | E2 |
|---|---|---|---|---|---|---|---|---|---|---|---|---|---|---|---|---|---|---|---|---|
| 31 | 0 | 0 | 0 | 0 | 0 | 1 | 0 | 0 | 0 | 0 | 0 | 0 | 0 | 0 | | | 1 | 0 | 0 | . |
| 32 | 0 | 0 | 0 | 0 | 0 | 0 | 1 | 0 | 0 | 1 | 0 | 0 | | | | | 0 | 1 | 1 | 0 |
| 33 | 1 | 0 | 0 | 0 | 0 | 0 | 0 | 1 | 0 | 0 | 0 | 0 | 0 | 0 | 0 | 0 | 0 | 0 | 1 | 1 |
| 34 | 0 | 1 | 0 | 0 | 0 | 0 | 0 | 0 | 0 | . | 1 | 0 | | | | | 0 | 0 | 0 | . |
| 35 | 0 | 0 | 1 | 0 | | | | . | 0 | . | 0 | 1 | 0 | | | | 0 | 0 | . | . |
| 36 | 0 | 0 | 0 | 1 | | | | . | 0 | . | 0 | 0 | 1 | | | | 0 | 0 | . | . |
| . | . | . | | | | | | . | . | . | . | . | | | | | . | . | . | . |
| . | . | . | | | | | | . | . | . | . | . | | | | | . | . | . | . |
| . | 0 | 0 | 0 | 0 | | | 0 | 0 | 0 | . | . | . | | | 0 | 1 | 0 | 0 | . | . |
| 64 | 0 | 0 | 0 | 0 | | 0 | 1 | 0 | 0 | 0 | 0 | | | | | 0 | 1 | 0 | 0 | 0 |
| 65 | 0 | 0 | | | | 0 | 0 | 1 | 1 | 1 | 0 | 0 | 0 | | | | 0 | 1 | 1 | 1 |

This matrix may be condensed and the following table lists the states taken by the logical elements in the course of a scanning cycle:

| $\overline{S8}$ | 65 | $\overline{S7}$ | 64 | E1 | E2 |
|---|---|---|---|---|---|
| 1 | 0 | 1 | 0 | 1 | 1 |
| 0 | 0 | 0 | 0 | 0 | 0 |
| 0 | 0 | 1 | 1 | 1 | 0 |
| 0 | 1 | 1 | 0 | 0 | 1 |
| 1 | 1 | 1 | 1 | 1 | 1 |

It is possible to derive from this table the states of E2 and of E1 as a function of the states taken on by the gates 7 and 8 and the last stages 64 and 65 of the registers 2a and 2b. The design of the loop-circuit as well as the correction of a possible false mode may be put into effect by taking into account only S8, 65, S7, 64 as inputs of the combinatory system which supplies E1 and E2. If one eliminates, in an effort for simplification, a certain number of possible neutral states, one may write the logical equations of the inputs E1 and E2:

$$E1 = \overline{S7} \cdot \overline{(S8 \cdot 64)}$$

$$E2 = \overline{S7} \cdot \overline{(S8 \cdot 64)}$$

The circuit of FIG. 4 carries out the operations symbolized by these equations and eliminates all false modes in one cycle at the most.

FIG. 5 shows the connections of the closed-loop circuit designed to produce the so-called "alternating" mode. The perfect alternating mode consists in the sequence 1, 2, 3 . . . 65, 1, 2. . . . It is the one which is used in practice. Yet, according to the invention, the diodes of the even row, on the one hand, and the diodes of the odd row, on the other hand, are connected with to different shift registers.

During a period equal to half a binary pulse two sequential photodiodes are linked to the output (for example, 65 and 1), during another half the following two photodiodes (for example, 2 and 3) in turn are tied to the output. The technological behavior of the photodiodes produces a scanning identical with the alternating scanning with a single shift register. The input E2 of the register 2*a* consists of the output of the gate 8, whereas the input E2 of the register 2*b* consists of the output of the gate 7. The out-of-phase clock signals CL1 and CL2 are applied simultaneously to the two registers.

Figure 6:
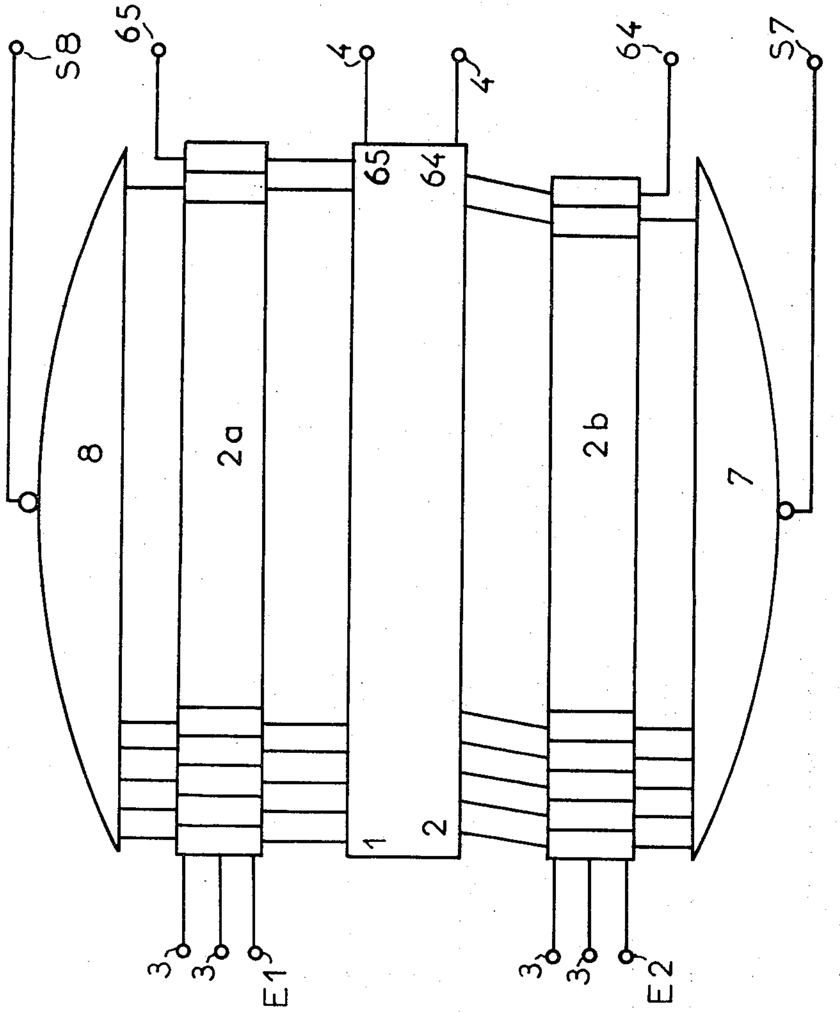
FIG. 6 is a diagram of a read head according to the invention.

FIG. 6 is an illustration, in diagram form, of the read head in which the elements, previously described, may be found again:

- the strip of photodiodes 1, each of these being connected with one position of one of the two shift registers,

- the two shift registers 2*a* and 2*b* and their inputs E1 and E2, consisting in the MOS gates and their outputs 64 and 65,

- the two OR gates 7 and 8 whose inputs are connected to k stages of the registers and which provide the reliability by elimination of false modes, and their outputs S7 and S8,

- terminals 3 for the introduction of clock signals and terminals 4 for the selection of the read signal.

The different scanning modes are achieved by linking the appropriate circuits between S7, 65, and E1, on the one hand, and between S8, 65, and E2, on the other hand.

It is of course possible by including a number N of shift registers to accomplish a simultaneous scanning of N subsystems of the strip of photodiodes, and the separation of the photodiodes in even and odd rows represents only one mode of embodiment of the invention.

What is claimed is:

1. Read head for an optical character-recognition system, the characters being arranged on a line passing in front of said head, including a strip of n photodetectors divided into *n'* groups which are essentially in line and approximately perpendicular to the direction of the passing and a switch synchronized by a clock-signal generator coupling sequentially each of the groups of photodetectors with the output of the head, characterized in that the *n'* groups are associated with *n'* distinct shift registers, respectively, providing the switching, said shift registers being interconnected by a logical closed-loop circuit controlling the initiation of sequencing of each group of photodetectors.

2. Read head according to claim 1, characterized by the photodetectors consisting of photodiodes, the subsystem of diodes of an even-row being coupled to a first shift register, the subsystem of diodes of an odd-row being coupled to a second register.

3. Read head according to claim 1, characterized by the *k*-l first stages of a register containing *k* stages being coupled with *k*-l inputs of an OR gate whose output is coupled to said closed-loop circuit.

4. Read head according to claim 1, characterized in that it comprises an output on the last stage of each of the shift registers, an output on each of the OR gates and an input for each of the two shift registers, the logical closed-loop circuit coupling said outputs and said inputs, the registers including, furthermore, at least one input for the clock signals and the strip, two outputs for the read signals.

5. Read head according to claim 1, characterized by the photodiodes, the shift registers, the OR gates, and their connections being integrated into a microcircuit.

6. In a read head for an optical character-recognition system, wherein character groups are arranged substantially perpendicular to a direction of motion of said character groups, the combination comprising: a plurality of photodetectors arranged substantially perpendicularly to said direction of motion, said plurality of photodetectors being arranged into *n'* photodetector groups; *n'* shift registers, each of said shift registers coupled to a one of said photodetector groups, wherein shift register elements of said each shift register are coupled sequentially to photodetectors of said one photodetector groups, said shift registers being coupled to an output terminal of said read head, said shift registers being activated in response clock signals, wherein said shift register elements receive binary logic data input signals from said coupled photodetectors in response to a read signal; $n'$ logic NOR gates, each of said NOR gates coupled to a one of said shift registers, wherein an input terminal of a logic NOR gate is connected to all but a final one of shift register elements of said coupled shift register; and circuit means coupled to said shift registers and to said logic NOR circuits for suppressing noise binary logic data contained in said shift register.

7. The combination of claim 6 wherein $n'$ is equal to 2.

8. A read head for an optical character-recognition system, said read heading containing a read signal terminal, at least one clock signal terminal, an output terminal and a plurality of terminals for coupling said read head to circuit means, the combination comprising: a plurality of photodetectors coupled to said read signal terminal, said plurality of photodetectors being divided into $n'$ photodetector groups; $n'$ shift registers, each shift register coupled to a one of said photodetector groups, photodetector elements of said one photodetector group coupled sequentially to shift register elements of said each shift register, said photodetector elements applying a binary logic data signal to said coupled shift register element in response to a control signal applied to said read signal terminal, each of said shift registers coupled to a clock signal terminal, wherein said shift register is activated by a clock signal applied to said coupled clock signal terminal, said shift registers being coupled to said output terminal, wherein each of said shift registers is coupled to a one said circuit means terminals; and $n'$ logic NOR gates, wherein each of said NOR gates is said shift registers, wherein a last element of said one shift register is not coupled to said each NOR gate, wherein all remaining shift registers elements of said one shift register are coupled to input terminals of said each NOR gate, wherein output terminals of said NOR gates are coupled to circuit means terminals.

9. The combination of claim 8 wherein said combination is fabricated into a microcircuit.

10. The combination of claim 9 wherein $n'$ is equal to 2.

11. The combination of claim 10 wherein a first NOR gate is coupled to a first shift register and a second NOR gate is coupled to a second shift register, said circuit means providing a coupling of said first NOR gate to said second shift register and a coupling of said second NOR gate to said first shift register.

12. In a character-recognition system, the combination of:

a plurality of photodetectors arranged in a column simultaneously to receive light signals corresponding to an information column of the character-recognition system, said photodetectors presenting a plurality $m$ of output terminals at which binary signals appear dependent upon the presence and absence of character information received by a corresponding photodetectors, said output terminals being divided into $n'$ groups of terminals;

a plurality $n'$ of shift registers, one associated with each group of output terminals and each having a number $k$ of stages corresponding to the number of output terminals of its associated group thereof, the output terminals of such associated group thereof being connected individually to the stages of the associated shift register whereby information is presented in parallel to each shift register and each stage of each shift register having a read output terminal and said read output terminals of each shift register being connected together whereby a false read mode would occur in response to simultaneous signals at more than one read output terminal of such each shift register, and each shift register having a command input terminal for inserting into the first stage thereof a binary command signal;

clock input means connected to each shift register for shifting said binary command signal sequentially through the associated $k$ stages correspondingly to gate the information of a photodetector output terminal to the corresponding read output terminal; and logic means associated with each shift register interconnecting command signals of each such shift register to the command input terminal of another shift register for inserting the binary command signal into such another shift register at a predetermined time.

13. In a character-recognition system as defined in claim 12 wherein each said logic means is connected to the first $k$-$l$ stages of its associated shift register.

14. In a character-recognition system as defined in claim 13 wherein each said logic means includes a NOR gate having the command signals of the corresponding $k$-$l$ stages connected as inputs thereto.

15. In a character-recognition system as defined in claim 13 wherein each said logic means includes gate means connected with the kth stage of its corresponding shift register.

16. In a character-recognition system as defined in claim 12 wherein said logic means cause said n' groups to be read sequentially.

17. In a character-recognition system as defined in claim 12 wherein said logic means cause stages of said $n'$ groups to be read alternately.

* * * * *